United States Patent

[11] 3,569,855

[72] Inventor Tomimitsu Noda
　　　　　　Yokohama-shi, Japan
[21] Appl. No. 788,869
[22] Filed Jan. 3, 1969
[45] Patented Mar. 9, 1971
[73] Assignee Tokyo Shibaura Electric Co., Ltd.
　　　　　　Kawasaki-shi, Japan
[32] Priority Jan. 16, 1968
[33] Japan
[31] 43/2288, 43/2289, 43/2290 and 43/2291

[54] POWER SUPPLY FOR HEATING MAGNETRON
　　　5 Claims, 11 Drawing Figs.
[52] U.S. Cl.................................................. 331/86,
　　　219/10.55, 315/207, 328/263, 331/185
[51] Int. Cl..................................................... H03b 9/10
[50] Field of Search........................................ 331/86, 87,
　　　185; 219/10.55; 328/230, 262, 263, 268; 315/220,
　　　207

[56] References Cited
UNITED STATES PATENTS
2,979,671　4/1961　Schall.......................... 328/262X
3,396,342　8/1968　Feinberg...................... 328/262

*Primary Examiner*—John Kominski
*Assistant Examiner*—Siegfried H. Grimm
*Attorney*—Flynn & Frishauf

ABSTRACT: A high frequency magnetron apparatus for use in heating ovens with an improved power source device which comprises a transformer for stepping up a source voltage, a magnetron disposed on the secondary side of the transformer, and a circuit positioned on said secondary side, consisting of a condenser and diode and arranged in such a manner that when there is supplied a voltage in one direction from the poser source provided on the secondary side of the transformer, the condenser is charged and that when there is supplied a voltage therefrom in the opposite direction, the secondary voltage of the transformer is combined with the charge voltage of the condenser to be impressed on the magnetron.

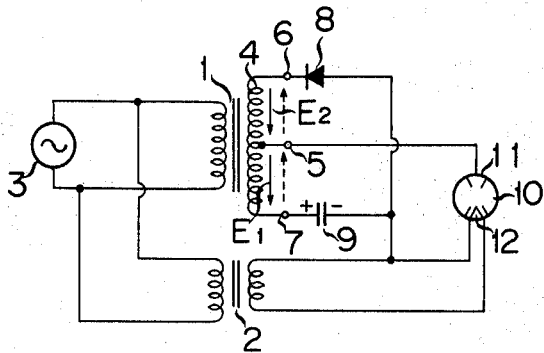
FIG. 1
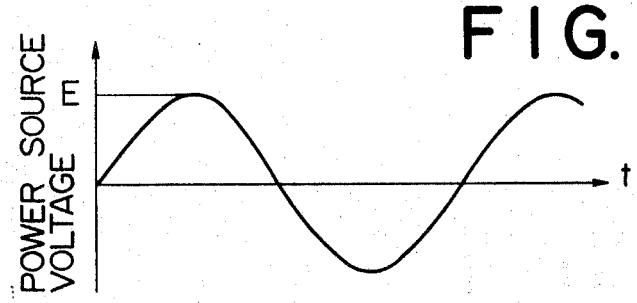
FIG. 2A
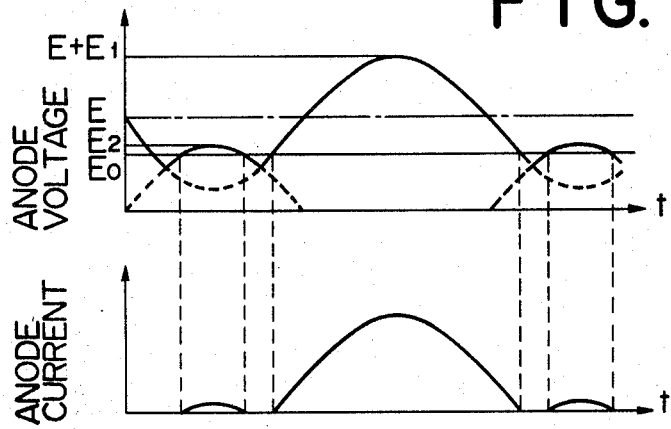
FIG. 2B
FIG. 2C
TOMIMITSU NODA,
INVENTOR.

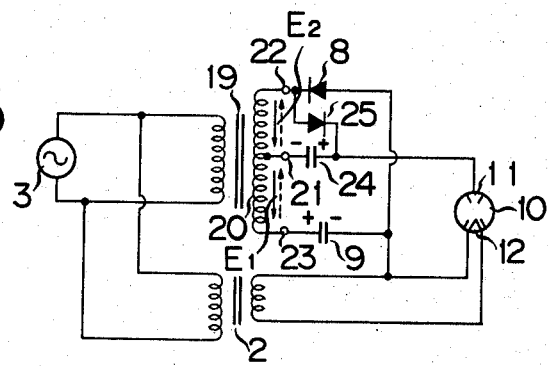
FIG. 5
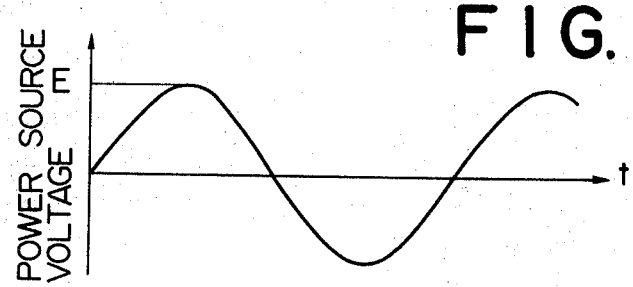
FIG. 6A
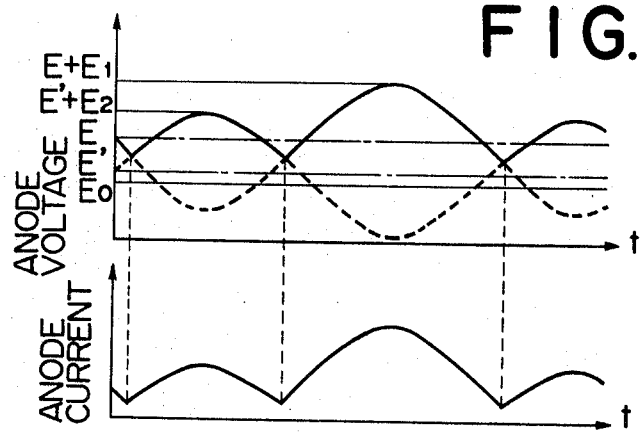
FIG. 6B
FIG. 6C

POWER SUPPLY FOR HEATING MAGNETRON

The present invention relates to a high frequency magnetron apparatus for use in heating ovens and more particularly to improvements in the power source device thereof.

A power source device for a high frequency magnetron apparatus heretofore used in a heating oven requiring a great deal of heat energy, such as an electron range, includes a type wherein an AC source voltage is stepped up to a prescribed value by a transformer and then impressed on the anode of a magnetron through a full-wave rectifying circuit and a self-rectifying type wherein the voltage stepped up by the transformer is directly supplied to a magnetron. However, a full-wave rectifying type like the former required four high voltage rectifying elements and had the drawback that the apparatus as a whole was very costly. On the other hand, the latter self-rectifying type required a peak anode current to be introduced in an amount equal to several times that used in the full-wave rectifying type in order to operate a magnetron as efficiently as the latter type, so that the life of a magnetron was unavoidably reduced. Further the aforementioned two types of power source device only permitted a certain magnitude of voltage to be supplied to the anode of the magnetron, failing to elevate the efficiency of heat energy released from the magnetron.

An object of the present invention is to provide a high frequency magnetron apparatus for use in heating ovens with a power source device so improved as to permit a simple arrangement without the necessity of using a full-wave rectifying circuit.

Another object of the invention is to provide a high frequency magnetron apparatus equipped with a power source device so improved as to allow the oscillation time of the magnetron to be freely varied.

Still another object of the invention is to provide a high frequency magnetron apparatus fitted with a power source device so improved as to elevate the utilization of a power source transformer by prolonging the oscillation time of the magnetron.

The present invention provides an improved power source device which comprises a transformer for stepping up a source voltage, a magnetron disposed on the secondary side of the transformer and a circuit positioned on said secondary side, consisting of a condenser and diode and arranged in such a manner that when there is supplied a voltage in one direction from the power source provided on the secondary side of the transformer, the condenser is charged and that when there is supplied a voltage therefrom in the opposite direction, the secondary voltage of the transformer is combined with the charge voltage of the condenser to be impressed on the magnetron, and wherein there is further included a movable intermediate tap disposed on the secondary side of the transformer, a means for varying the charge voltage of a condenser or another circuit consisting of a condenser and diode so as to increase the anode current of the magnetron.

The present invention can be more fully understood from the following detailed description when taken in connection with the appended drawings, in which:

FIG. 1 is a diagram of circuit connection according to an embodiment of the present invention;

FIGS. 2A, 2B and 2C represent wave forms illustrative of the operation of the circuit of FIG. 1;

FIG. 5 is a diagram of circuit connection according to a further embodiment of the invention;

FIGS. 6A, 6B and 6C show wave forms illustrative of the operation of the circuit of FIG. 5.

Figure 3:
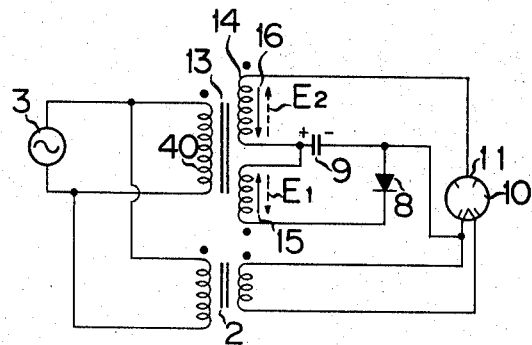
FIG. 3 is a diagram of circuit connection according to another embodiment of the invention.

There will now be described an embodiment of the present invention by reference to the appended drawings. Referring to FIG. 1, there is connected to an AC source 3 an anode transformer 1 and heater transformer 2. The secondary coil 4 of the transformer 1 has an intermediate tap 5 which is connected to the anode 11 of the magnetron 10. Terminals 6 and 7 of the secondary coil 4 are connected to a diode 8 of the indicated polarity and to a condenser 9, respectively. The secondary side of the heater transformer 2 is connected to the cathode heater 12 of the magnetron 10 and one of the connection lines therebetween to an intermediate point on a conductor line connecting the diode 8 and condenser 9.

There will now be described the operation of the magnetron apparatus of FIG. 1 having the aforementioned arrangement. Let it be assumed that there is impressed a voltage $E$ on the secondary coil 4 in the direction of the solid line arrow of FIG. 1. Then there is introduced a current through a closed circuit consisting of the diode 8, secondary coil 4 and condenser 9 to charge the condenser 9 in the indicated polarity. With the voltage impressed on the secondary coil 4 of the anode transformer designated as $e = E \sin \omega t$, the charge $Q$ accumulated in the condenser 9 will amount to $Q = CE$, and the charge voltage thereof will have a magnitude of $E$. Where the secondary coil 4 is impressed with a voltage in the direction of the dotted line arrow indicated, then there will be supplied to the anode of the magnetron 10 a voltage which is obtained by superimposing a voltage $E_1$ impressed across the intermediate tap 5 and a terminal 7 on the charge voltage $E$ of the condenser 9. Therefore, as a whole, there is supplied to the anode of the magnetron 10 a voltage as shown in FIG. 2B which is composed of a combination of a voltage $E_1$ impressed across the intermediate tap 5 and a terminal 7 and superimposed on the charge voltage $E$ of the condenser 9 and a voltage $E_2$ impressed across the intermediate tap 5 and a terminal 6. When said composite voltage exceeds the oscillation voltage $E_0$ (taken as a direct current) of the magnetron 10, there will flow therethrough an anode current as shown in FIG. 2C to cause its oscillation. Since the magnetron 10 is supplied with the composite voltage the oscillation time thereof can be made substantially as long as that produced by a full-wave rectifying type.

If, in the embodiment of FIG. 1, the intermediate tap 5 is changed in position, there will also be varied the anode voltage of the magnetron 10, thus making it possible to adjust the time the current flows through the anode of the magnetron 10, namely, its oscillation time. Accordingly, the heat energy released from the magnetron can be controlled. In this case, there is only required a smaller peak anode current than in a self-rectifying type, resulting in the longer life of the magnetron.

Figure 4:
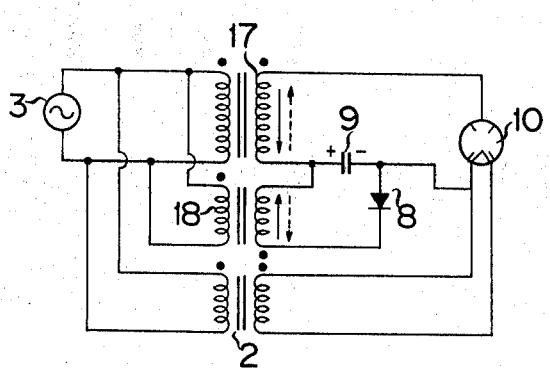
FIG. 4 is a diagram of circuit connection according to still another embodiment of the invention.

There will now be described other embodiments of the present invention by reference to the appended drawings. Throughout the FIGS., the same parts as in FIG. 1 are denoted by the same numerals and description thereof is omitted. FIGS. 3 and 4 represent the embodiments for rendering the charge voltage of the condenser 9 variable. In FIG. 3 the transformer 13 comprises the secondary coil member 16 consisting of two divided secondary coils 14 and 15. One line of said secondary coil member 16 is connected to the magnetron 10 as indicated and the other line to the condenser 9 through the diode 8 of the indicated polarity. Of the aforesaid two divided secondary coils 14 and 15, the former is so wound as to cause a voltage to be impressed in the same direction as in the primary coil 40 and the latter is so wound as to cause a voltage to be impressed in the opposite direction to that in which said primary coil 40 is impressed with a voltage.

There will now be described the operation of the embodiment of FIG. 3. When a secondary voltage is impressed in the direction of the solid line arrow, the condenser 9 is charged in the indicated polarity. When the secondary voltage is impressed in the direction of the dotted line arrow, the anode 11 of the magnetron 10 is supplied with the secondary voltage impressed on the secondary coil 14 in combination with the charge voltage of the condenser 9. Thus there is accumulated in the condenser 9 a charge corresponding to the ratio in which the secondary coil member 16 is divided into two segments, or more concretely a charge corresponding to the voltage impressed on the divided secondary coil 15. Thus if the ratio in which the secondary coil member 16 is divided is suitably changed, the charge voltage of the condenser 9 can also be varied, enabling the oscillation time of the magnetron 10 to be adjusted. The embodiment of FIG. 4 has another transformer 18 to charge the condenser 9 in addition to the anode transformer 17. If, therefore, the number of windings on the transformer 18 is suitably selected the charge voltage of the condenser 9 can be varied from the primary side, enabling the oscillation time of the magnetron 10 to be adjusted in the same way as described above. In FIG. 4, the secondary coil of the transformer 17 is so connected as to cause a voltage to be impressed in the same direction as in the primary coil, and the secondary coil of the transformer 18 is so connected as to cause a voltage to be impressed in the opposite direction to that in which the primary coil is impressed with a voltage.

Referring now to FIG. 5, numerals 19 and 2 denote an anode transformer and heater transformer respectively, which are connected to an AC source 3. The secondary coil 20 of the anode transformer 19 has an intermediate tap 21. To both ends 22 and 23 of the secondary coil 20 of the anode transformer 19 are serially connected the diode 8 of the indicated polarity and the condenser 9. The intermediate tap 21 of the secondary coil 20 is connected through the condenser 24 to the anode 11 of the magnetron 10. There is also interposed the diode 25 of the indicated polarity between the conductor line connecting the condenser 24 and the anode 11 of the magnetron 10 and the conductor line connecting the cathode of the diode 8 and the terminal 22 of the secondary coil 20. On the other hand, the secondary side of the heater transformer 2 is connected to the heater 12 of the magnetron 10 and one of said connection lines contacts an intermediate point on a line connecting the condenser 9 and diode 8.

There will now be described a power source device of the aforementioned circuit arrangement. Let it be assumed that there is impressed a voltage on the secondary side of the anode transformer 19 in a normal direction to the diode 8 as indicated by the solid line arrow. Then there flows a current through the circuit consisting of the condenser 9, diode 8 and secondary coil 20 to cause the condenser 9 to be charged in the indicated polarity. With the secondary voltage of the transformer 19 impressed on the magnetron 10 denoted as $e = E \sin\omega t$ as shown in FIG. 6A, the charge accumulated in the condenser 9 amounts to $Q = CE$, causing the charge voltage of the condenser 9 to have a magnitude of $E$. In this case there is not introduced a current through the circuit consisting of the intermediate tap 21 of the secondary coil, condenser 24, and diode 25. With the voltage impressed in the opposite direction to the diode 8 as shown by the dotted line arrow is induced in the secondary side of the transformer 19, then said voltage is combined with the charge voltage $E$ of the condenser 9. In this case there flows a current through the closed circuit consisting of the diode 25, condenser 24 and intermediate tap 21 of the secondary coil 20.

Therefore, as a whole, the anode 11 of the magnetron 10 is impressed with a voltage as shown in FIG. 6B which is composed of a combination of a voltage $E$ impressed across a terminal 22 and a terminal 23 and superimposed on the charge voltage $E$ of the condenser 9 and a voltage $E_2$ impressed across a terminal 22 and the intermediate tap 21 and superimposed on the charge voltage $E'$ of the condenser 24. When the voltage impressed on the anode of the magnetron 10 exceeds the oscillation voltage $E_0$ (taken as a direct current) of the magnetron 10, the anode of the magnetron 10 is supplied with a current as shown in FIG. 6C to cause it to oscillate. The oscillation of the magnetron 10 can last substantially as long as in a full wave rectifying type. In the embodiment of FIG. 5, the circuit consisting of the condenser 24 and diode 25 is connected to the secondary side of the transformer 19, so that the anode of the magnetron 10 is supplied with some current when a voltage is impressed on the secondary coil in the direction of the solid line arrow as well as in that of the dotted line arrow. The reason is that when the secondary voltage is impressed in the direction of the dotted line, the condenser 24 is charged to a voltage $E'$ in the indicated polarity and when the voltage is impressed in the direction of the solid line, the voltage $E_2$ across the terminal 22 and intermediate tap 21 is combined with the charge voltage $E'$ of the condenser 24 to be supplied to the anode of the magnetron 10, causing said composite voltage $E' + E_2$ impressed on said anode to exceed the oscillation voltage $E_0$ of the magnetron 10. Accordingly, the embodiment of FIG. 5 permits the oscillation time to be more prolonged than that of FIG. 1. This has the advantage of elevating the utilization of the anode transformer 19, fully raising the efficiency of the magnetron 10 due to the requirement of only a small peak anode current and consequently extending the life of the magnetron 10. It will be apparent that the embodiment of FIG. 5 permits the oscillation time of the magnetron to be rendered variable by changing the position of the intermediate tap 21.

Figure 7:
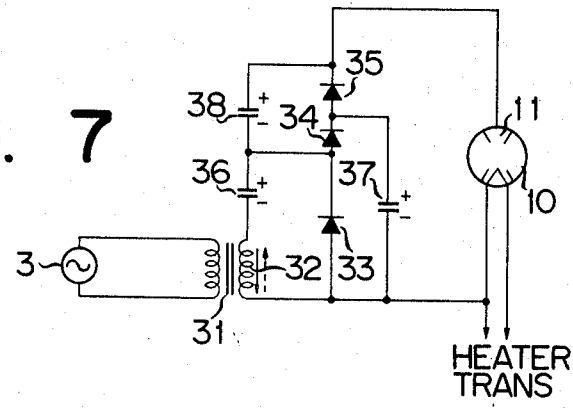
FIG. 7 is a diagram of circuit connection according to a still further embodiment of the invention.

A multiple voltage circuit formed, as shown in FIG. 7, by connecting diodes 33, 34 and 35 and condensers 36, 37 and 38 to the secondary coil 32 of the anode transformer 31 as indicated can display substantially the same effect as described above. The embodiment of FIG. 7 is operated in the following manner. When a secondary voltage is impressed in the direction of the solid line arrow, the condenser 36 is charged in the indicated polarity through a circuit consisting of the diode 33, condenser 36 and secondary coil 32. When the secondary voltage is impressed in the direction of the dotted line arrow, the condenser 37 is charged to the indicated polarity through a circuit consisting of the secondary coil 32, condenser 36, diode 34 and condenser 37. When the secondary voltage is again shifted to the direction of the solid line arrow, the condensers 36 and 38 are supplied with the secondary voltage combined with the charge voltage of the condenser 37 which is stored with the charge voltage of the condenser 36 and secondary voltage, from a circuit consisting of the secondary coil 32, condenser 37, diode 35 and condensers 36 and 38. And when the secondary voltage is again impressed in the direction of the dotted line arrow, the anode 11 of the magnetron 10 is supplied with said secondary voltage combined with the charge voltage of the condenser 38.

As mentioned above, the present invention provides a high frequency magnetron apparatus for use in heating ovens with an improved power source device which is capable of varying, for example, prolonging, the oscillation time of a magnetron without using a full wave rectifying circuit.

I claim:

1. A high frequency magnetron apparatus for use in heating ovens with an improved power source device which comprises an AC voltage-generating source, a transformer for stepping up said source voltage to a prescribed level, a diode whose cathode is connected to one end of the secondary coil of the transformer, a condenser connected to the other end of the secondary coil of the transformer and in series with the diode, a magnetron whose anode is connected to an intermediate tap on the secondary coil of the transformer and whose cathode is connected to an intermediate point on a line connecting the condenser and diode, and means to heat the cathode of the magnetron.

2. A high frequency magnetron apparatus for use in heating ovens with an improved source voltage which comprises an AC voltage-generating source, a transformer for stepping up said source voltage to a prescribed level provided with a secondary coil member divided into a first secondary coil impressed with a voltage in the same direction as in a primary coil and a second secondary coil impressed with a voltage in the opposite direction to that in which the primary coil is impressed with a voltage, a condenser commonly connected to one end of each of the first and second secondary coils of the transformer, a diode having its cathode connected to the other end of the second secondary coil of the transformer and serially connected to the condenser, and a magnetron whose anode is connected to the other end of the first secondary coil of the transformer and whose cathode is connected to an intermediate point between the condenser and diode, and means to heat the cathode of the magnetron.

3. A high frequency magnetron apparatus for use in heating ovens with an improved power source device which comprises an AC generating source, first and second transformers for stepping up the source voltage to a prescribed level, the secondary coil of the first transformer respectively being so wound as to cause a voltage to be impressed in the same direction as in a primary coil and the secondary coil of the second transformer being so wound as to cause a voltage to be impressed in the opposite direction to that in which the primary coil is impressed with a voltage, a condenser connected to one end of the secondary coil of the first and second transformers respectively, a diode having its cathode connected to the other end of the secondary coil of the second transformer and serially connected to the condenser, and a magnetron whose anode is connected to the other end of the secondary coil of the first transformer and whose cathode is connected to an intermediate point between the condenser and diode, and means to heat the cathode of the magnetron.

4. A high frequency magnetron apparatus for use in heating ovens with an improved power source device which comprises an AC generating source, a transformer for stepping up the source voltage to a prescribed level, a first diode having its cathode connected to one end of the secondary coil of the transformer, a first condenser connected to the other end of the secondary coil of the transformer in series with the first diode, a second diode having its anode connected to one end of the secondary coil of the transformer to which is connected the cathode of the first diode, a second condenser connected to the intermediate tap of the secondary coil of the transformer in series with the second diode, and a magnetron whose anode is connected to an intermediate point between the second diode and second condenser and whose cathode is connected to an intermediate point between the first diode and first condenser, and means to heat the cathode of the magnetron.

5. A high frequency magnetron apparatus for use in heating ovens with an improved power source device which comprises an AC voltage-generating source, a transformer for stepping up the source voltage to a prescribed level, a first condenser connected to one end of the secondary coil of the transformer, a first diode having its anode connected to the other end of the secondary coil of the transformer and serially connected to the first condenser, a second diode having its anode connected to the cathode of the first diode, a second condenser connected between the cathode of the second diode and that end of the secondary coil of the transformer to which is connected the anode of the first diode, a third diode having its anode connected to the cathode of the second diode, a third condenser interposed between the cathode of the third diode and an intermediate point on a line connecting the second diode and first condenser, and a magnetron whose anode is connected to the cathode of the third diode and whose cathode is connected to that end of the secondary coil of the transformer which contacts the anode of the first diode, and means to heat the cathode of the magnetron.